United States Patent
Higgins

(10) Patent No.: US 11,319,000 B2
(45) Date of Patent: May 3, 2022

(54) STAKE ASSEMBLY

(71) Applicant: Toyota Motor Engineering & Manufacturing North America, Inc., Plano, TX (US)

(72) Inventor: Christopher M. Higgins, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 155 days.

(21) Appl. No.: 16/707,469

(22) Filed: Dec. 9, 2019

(65) Prior Publication Data

US 2021/0171126 A1 Jun. 10, 2021

(51) Int. Cl.
*B60P 7/135* (2006.01)
*B62D 33/02* (2006.01)

(52) U.S. Cl.
CPC .......... *B62D 33/0207* (2013.01); *B60P 7/135* (2013.01)

(58) Field of Classification Search
CPC ...... B60P 3/40; B60P 3/41; B60P 7/06; B60P 7/0892; B60P 7/12; B60P 7/135; B60P 7/15; B62D 33/0207; B60R 9/06
USPC ....... 410/36, 37, 121, 130, 150, 153; 296/43
See application file for complete search history.

(56) References Cited

U.S. PATENT DOCUMENTS

| | | | | |
|---|---|---|---|---|
| 4,650,383 A | * | 3/1987 | Hoff ......................... | B60P 7/15 410/149 |
| 4,770,579 A | * | 9/1988 | Aksamit .................. | B60P 7/15 410/121 |
| 5,433,566 A | * | 7/1995 | Bradley .................... | B60P 7/15 410/121 |
| 6,193,452 B1 | * | 2/2001 | Skiba ....................... | B60P 3/40 410/143 |
| 7,832,969 B2 | * | 11/2010 | Lambousis ........... | B60P 7/0892 410/34 |
| 2016/0311474 A1 | | 10/2016 | Conny | |
| 2017/0361756 A1 | | 12/2017 | Marchlewski et al. | |
| 2019/0031250 A1 | | 1/2019 | Higgins | |

* cited by examiner

*Primary Examiner* — Stephen T Gordon
(74) *Attorney, Agent, or Firm* — Christopher G. Darrow; Darrow Mustafa PC

(57) ABSTRACT

A stake assembly is disclosed with reference to a vehicle that includes a bed with a deck and a wall, and a rail secured to the wall. The stake assembly includes a stake axis, a stake base, a rail adaptor supported from the stake base, and a deck adaptor supported from the stake base. The stake base extends along the stake axis. The rail adaptor extends laterally to the stake axis beside the stake base and is configured to secure to the rail. The deck adaptor extends along the stake axis beneath the stake base and is configured to secure to the deck.

20 Claims, 2 Drawing Sheets

STAKE ASSEMBLY

TECHNICAL FIELD

The embodiments disclosed herein relate to pickup trucks and like vehicles with beds and, more particularly, to equipping the vehicles with stake-based bed accessories.

BACKGROUND

Pickup trucks and like vehicles with beds are commonly manufactured to include stake pocket assemblies as OEM equipment. For the typical vehicle, the stake pocket assemblies include stake pockets inside the bed, and corresponding access holes atop the bed. The stake pocket assemblies serve as built-in mounts for users to equip their vehicle with stake-based bed accessories. Specifically, the stake pockets hold stakes that extend inside the bed from the stake pockets, and above the bed through the access holes. The stakes may, for example, serve as the legs of sideboards, racks and the like.

Not all users take advantage of their vehicle's stake pocket assemblies. For instance, not all users equip their vehicle with stake-based bed accessories. Moreover, some users who do equip their vehicle with stake-based bed accessories opt for universal versions that eschew the vehicle-specific stake pocket assemblies in favor of universal mounts atop the bed. At the same time, for all users, the stake pocket assemblies will have increased the cost of their vehicle. Moreover, the stake pockets will have limited opportunities for their vehicle to have been manufactured to package other items inside the bed. Moreover, the access holes will have limited opportunities for their vehicle to have been styled with anything but wide, flat surfaces and/or garnishes with pop-outs or removable covers atop the bed.

Accordingly, both users and manufactures of pickup trucks and like vehicles with beds may desire improvements for equipping the vehicles with stake-based bed accessories without having the vehicles manufactured to include stake pocket assemblies as OEM equipment.

SUMMARY

Disclosed herein are embodiments of a stake assembly for a vehicle that includes a bed with a deck and a wall, and a rail secured to the wall. The stake assembly includes a stake axis, a stake base, a rail adaptor supported from the stake base, and a deck adaptor supported from the stake base. The stake base extends along the stake axis. The rail adaptor extends laterally to the stake axis beside the stake base, and is configured to secure to the rail. The deck adaptor extends along the stake axis beneath the stake base, and is configured to secure to the deck. This and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

In relation to a vehicle that includes a bed with a deck and a wall, and a rail secured to the wall, this disclosure teaches a rail-mounted stake assembly. In addition to at least one of a stake pocket for holding a stake, and the stake itself, the stake assembly includes a rail adaptor and a deck adaptor for securing the stake assembly to the rail and to the deck. Thus enjoying stability against both the rail and the deck, the stake assembly is configured to support the stake for extension above the bed such that the moment-arm associated with loading on the stake is counteracted. In conjunction with the stake assembly, the rail may serve as a mount for users to equip the vehicle with stake-based bed accessories. One or more stakes of one or more stake assemblies may, for example, serve as the legs of sideboards, racks and the like. Likewise, the vehicle may be equipped with stake-based bed accessories without having the vehicle manufactured to include stake pocket assemblies as OEM equipment.

Figure 1A:
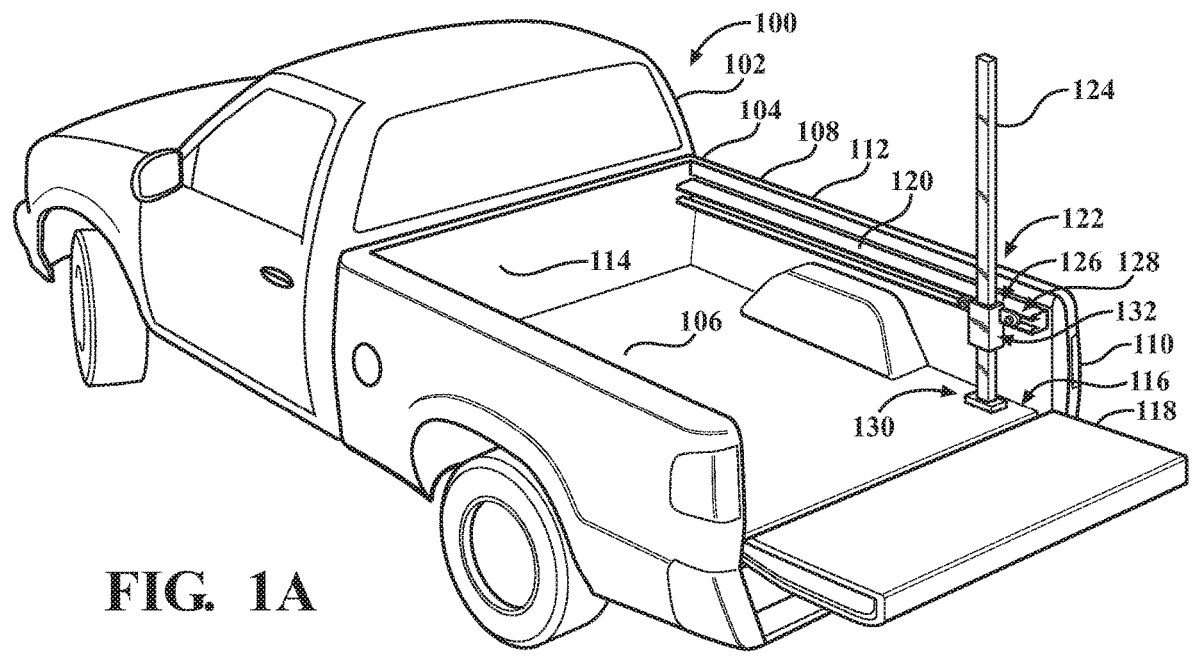
FIG. 1A is a perspective view of a vehicle that includes a bed with a deck and a wall, a rail secured to the wall, and a rail-mounted stake assembly with a rail adaptor and a deck adaptor, showing the stake assembly being secured to the rail using the rail adaptor, and to the deck using the deck adaptor, for stability against both the rail and the deck.

A representative passenger vehicle 100 is shown in FIG. 1A. As shown, the vehicle 100 is a pickup truck. The vehicle 100 includes an exterior and a number of interior compartments, and a body 102 that forms the exterior and defines or otherwise encloses the compartments. The compartments include a passenger compartment, an engine compartment and, in the illustrated pickup truck configuration of the vehicle 100, an open-topped bed 104 for carrying cargo. Among other things, the vehicle 100 may include seats, a dash assembly, an instrument panel, controls and the like housed in the passenger compartment. Additionally, the vehicle 100 may include an engine, a motor, a transmission and the like, as well as other powertrain components, such as wheels, housed in the engine compartment and elsewhere in the vehicle 100. The wheels support the remainder of the vehicle 100 on the ground. One, some or all of the wheels are powered by the remainder of the powertrain components to drive the vehicle 100 along the ground.

The body 102 of the vehicle 100 defines the bed 104. In relation to the bed 104, the body 102 includes a deck 106, one or more walls 108 above the deck 106, and a rear end 110. As shown, the walls 108 include sides 112 and a bulkhead 114. At the rear end 110, the body 102 defines a tailgate opening 116. Similarly to other openings that open between the compartments and the exterior, the tailgate opening 116 opens between the bed 104 and the exterior. Relatedly, as part of the rear end 110, the body 102 includes a tailgate 118 corresponding to the tailgate opening 116. Similarly to other closure panels that correspond to other openings, the tailgate 118 is pivotally connected to the remainder of the body 102 for movement, relative to the tailgate opening 116, between a closed position over the tailgate opening 116, and an open position away from the tailgate opening 116.

The vehicle 100 further includes a representative example of a rail 120. The rail 120 is in the bed 104 above the deck 106, and is secured to a wall 108 of the bed 104. For instance, as shown, the rail 120 is secured to a side 112 of the bed 104. Also known as an "accessory rail," the rail 120 may serve as a mount for users to equip the vehicle 100 with rail-mounted bed accessories, including but not limited to stake-based bed accessories as set forth herein, via securement to the rail 120. Although the vehicle 100, as shown, includes one rail 120 secured to a side 112 of the bed 104, it will be understood that this disclosure is applicable in principle to more than one rail 120 and/or a rail 120 secured to another wall 108 of the bed 104.

The vehicle 100 further includes a stake assembly 122 mounted to the rail 120 of the vehicle 100. The stake assembly 122 includes or is otherwise configured to support a stake 124. Accordingly, in conjunction with the stake assembly 122, the rail 120 may serve as a mount for users to equip the vehicle 100 with stake-based bed accessories. One or more stakes 124 of one or more stake assemblies 122 may, for example, serve as the legs of sideboards, racks and the like. Likewise, the vehicle 100 may be equipped with stake-based bed accessories without having the vehicle 100 manufactured to include stake pocket assemblies as OEM equipment.

The stake assembly 122 has a stake axis that is normal to the rail 120 of the vehicle 100, and normal to the deck 106 of the vehicle 100. When the stake 124 is supported by the stake assembly 122, the stake 124 extends along the stake axis. The stake assembly 122 also includes a stake base 126. The stake base 126 extends along the stake axis, and is configured to support the stake 124 for extension above the bed 104 along the stake axis. As set forth in additional detail below, the stake assembly 122 is configured to be secured to the rail 120 of the vehicle 100 and to the deck 106 of the vehicle 100. As shown, the stake base 126 is configured to be secured to the rail 120 by a rail adaptor 128, and is configured to be secured to the deck 106 by a deck adaptor 130.

Figure 1B:
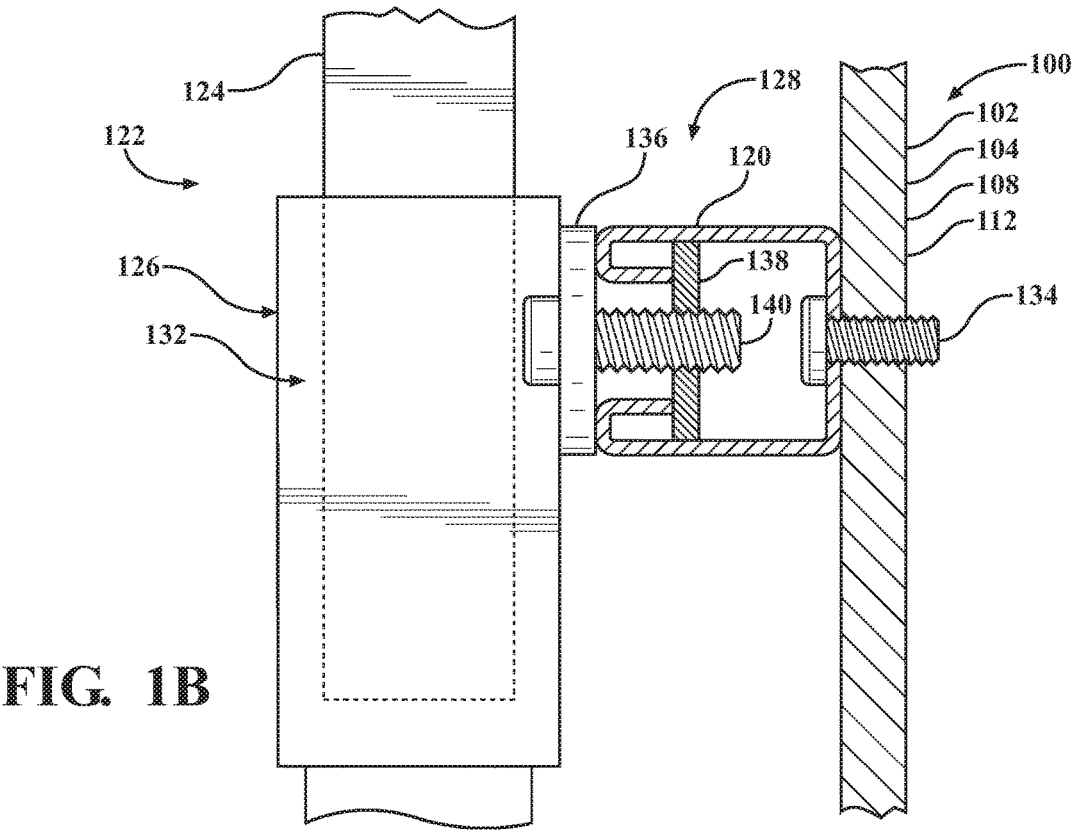
FIG. 1B is a cross sectional view of the vehicle, showing aspects of the stake assembly being secured to the rail using the rail adaptor.

The stake assembly 122 includes at least one of a stake pocket 132 for holding the stake 124, and the stake 124 itself. As shown in FIG. 1B, the stake base 126 is the stake pocket 132. The stake pocket 132 extends along the stake axis such that the stake pocket 132 opens along the stake axis. The stake pocket 132 is configured to receive the end of the stake 124 from above and support the stake 124 by its end. Thus, the stake 124 extends above the bed 104 along the stake axis. Alternatively, the stake base 126 may be the end of the stake 124 itself. In this implementation, the end of the stake 124 extends along the stake axis, and the stake 124 is self-supported by its end. Thus, the stake 124 extends above the bed 104 along the stake axis.

The stake base 126 is configured to be secured to the rail 120 by the rail adaptor 128 to prevent the stake assembly 122 from twisting toward the rail 120 when the stake assembly 122 supports the stake 124. The rail adaptor 128 also allows a user to choose the placement of the stake assembly 122 along the rail 120. The location of the stake assembly 122 along the rail 120 may vary based on the configuration of the stakes 122 that is needed for various stake-based bed accessories. The rail adaptor 128 is supported laterally from the stake base 126 such that it is lateral to the stake axis. As such, the rail adaptor 128 is aligned with the rail 120 and secures the stake assembly 122 normal to the rail 120.

In one example, the rail 120 is a C-channel rail 120 with an open mouth, and the rail adaptor 128 is a C-channel compatible rail adaptor 128. The rail 120 is configured to be secured to the wall 108 of the vehicle 100 with a rail fastener 134. The rail fastener 134 may be a bolt or any other suitable fastener. The rail 120 may include multiple rail fasteners 134 along the length of the rail 120 for securing the rail 120 to the wall 108.

The rail adaptor 128 includes wing plates 136, which are configured to be secured to the rail 120. The wing plates 136 flank the stake base 126, and extend laterally from the stake axis. As such, the wing plates 136 and extend laterally from the stake base 126, and are aligned with the rail 120. The wing plates 136 are generally ear-shaped so as to be configured to back against the rail 120 from outside the rail 120, and sit in front of the mouth of the rail 120. The rail adaptor 128 also includes channel nuts 138, which are inside the rail 120 behind the mouth of the rail 120, aligned with and in spaced opposition with the wing plates 136, and backed against the rail 120 from inside the rail 120. The rail adaptor 128 also includes rail adaptor fasteners 140, which secure the wing plates 136 and the channel nuts 138 to the rail 120. The rail adaptor fasteners 140 may be bolts or any other suitable fasteners. As illustrated, the rail adaptor fasteners 140 are normal to the wing plates 136 and the channel nuts 138. The rail adaptor fasteners 140 extend from the outside the rail 120, through the wing plates 136, through the mouth of the rail 120, and to the inside of the rail 120. Inside the rail 120, the rail adaptor fasteners 140 thread with the channel nuts 138. As such, the rail adaptor fasteners 140 tighten the wing plates 136 and the channel nuts 138 against the rail 120 to secure the stake assembly 122 thereto.

While the rail adaptor 128 stabilizes the stake assembly 122 from twisting toward the rail 120, the stake assembly 122 may also benefit from further support from beneath the stake assembly 122. For example, when the stake 124 is supported by the stake assembly 122 for extension above the bed 104, loading on the stake 124 may create a large moment-arm about the stake base 126. To counteract the associated moment-arm, the stake assembly 122 includes a deck adaptor 130, which secures the stake assembly 122 to the deck 106 to stabilize the stake base 126 against the deck 106 from twisting about the rail 120.

Figure 2:
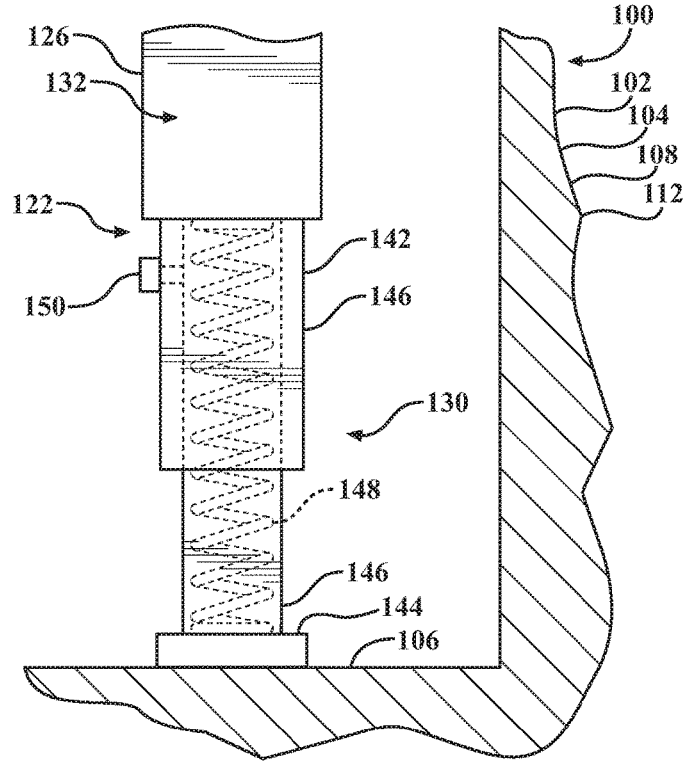
FIG. 2 is a cross sectional view of the vehicle, showing, with reference to an adjustable leg of the deck adaptor, aspects of the stake assembly being secured to the deck using the deck adaptor.

As shown in FIG. 2, the deck adaptor 130 is supported from the stake base 126, and extends beneath the stake base 126 along the stake axis. The deck adaptor 130 extends normal to the rail 120, and includes a leg 142 for reaching from the rail 120 to the deck 106 of the vehicle 100, and a foot 144 for securing the deck adaptor 130 to the deck 106 of the vehicle 100. As shown, the leg 142 extends from a bottom surface of the stake base 126, and supports the foot 144 at its end.

The leg 142 may have a fixed length or, as shown, may have an adjustable length to accommodate for various wall 108 heights across different types of vehicles 100. Specifically, the distance between the rail 120 and the deck 106 may vary based on the height of the wall 108 of the vehicle 100 and the placement of the rail 120 on the wall 108. Therefore, the leg 142 may have an adjustable length so that the stake base 126 may be secured between the rail 120 and the deck 106. As such, the leg 142 is formed from one or more leg segments 146, and is biased for increased length. As shown, the leg segments 146 are telescoping segments which are connected by a leg spring 148. The leg spring 148 engages between the leg segments 146 such that the leg segments 146 are tensioned apart to the desired length. As such, the leg spring 148 may be a compression spring. The leg 142 also includes a leg pin 150. The leg 142 may include a slot extending between the leg segments 146 such that the leg pin 150 is engaged inside the slot to set the length of the leg 142 at the desired length. The leg 142 may include one or more of the leg segments 146, the leg spring 148, and the leg pin 150, or other suitable adjustable mechanisms.

The leg 142 extends to the foot 144, which secures the deck adaptor 130 to the deck 106 of the vehicle 100. In many vehicles equipped with a deck 106, the deck 106 may have a variety of surface geometries that the foot 144 may be configured to make a mating connection with. For example, the deck 106 of the vehicle 100 may have one or more beads 152 that run lengthwise along the deck 106. The dimensions of the beads 152 may vary across different types of vehicles 100.

Figure 3A:
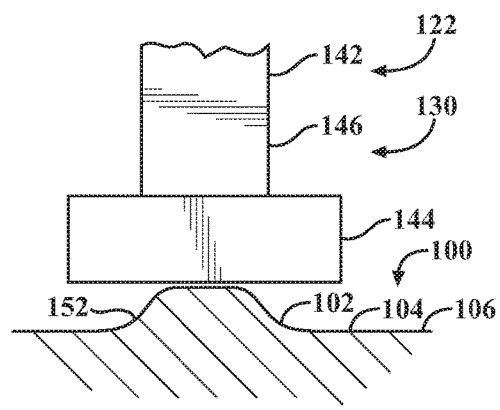
FIGS. 3A and 3B are cross sectional views of the vehicle, showing, with reference to an example bead of the deck and an example compliant foot of the deck adaptor, aspects of the stake assembly being secured to the deck using the deck adaptor, including the foot conforming to the shape of the bead to make a mating connection therewith.
Figure 3B:
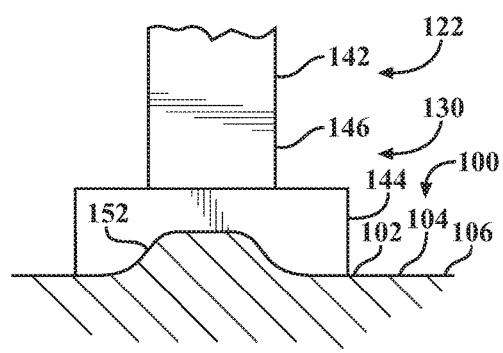

As shown in FIGS. 3A and 3B, a bottom surface of the foot 144 may be formed from a compliant material in order to be compatible with the beads 152 or otherwise with the decks 106 of many vehicles 100. For instance, the bottom surface of the foot 144 may be a cushion which is formed from a flexible foam, rubber, or other suitable material. As shown, the foot 144 makes a female-to-male mating connection with a bead 152 as the compliant material depresses to exteriorly conform to the shape of the bead 152. In another instance, the foot 144 may make a male-to-female mating connection with two beads 152 as the compliant material compresses to interiorly conform in between the two beads 152.

Alternatively, or additionally, the foot 144 may have an adjustable width in order to be compatible with the beads 152 or otherwise with the decks 106 of many vehicles 100. As shown, the foot 144 is biased for either increased or decreased width and is configured to make a mating connection with the beads 152.

Figure 4:
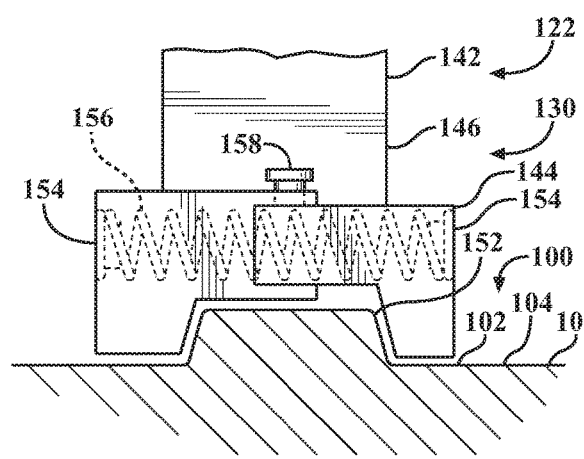
FIG. 4 is a cross sectional view of the vehicle, showing, with reference to an example bead of the deck and an example adjustable foot of the deck adaptor, aspects of the stake assembly being secured to the deck using the deck adaptor, including the foot having an adjustable width for making female-to-male mating connection with the bead.

As shown in FIG. 4, the foot 144 may be formed from one or more first foot segments 154. The first foot segments 154 are telescoping segments that are connected by a first foot spring 156. The first foot spring 156 is a tension spring engaged between the first foot segments 154. As such, the first foot segments 154 are compressed together so that they are exteriorly secured over a bead 152 in order to make a female-to-male mating connection with the bead 152. The foot 144 may also include a first foot pin 158. The foot 144 may include a slot extending between the first foot segments 154 such that the first foot pin 158 is engaged inside the slot to set the width of the foot 144 at the desired width. The foot 144 may include one or more of the first foot segments 154, the first foot spring 156, the first foot pin 158, or other suitable adjustable mechanisms.

Figure 5:
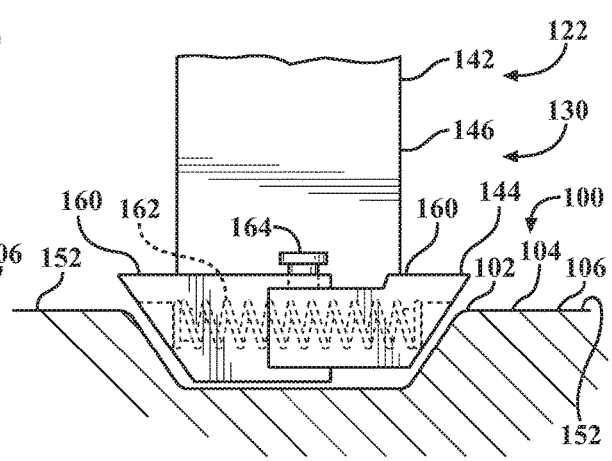
FIG. 5 is a cross sectional view of the vehicle, showing, with reference to example beads of the deck and an example adjustable foot of the deck adaptor, aspects of the stake assembly being secured to the deck using the deck adaptor, including the foot having an adjustable width for making male-to-female mating connection with the beads.

As shown in FIG. 5, the foot 144 may be formed from one or more second foot segments 160. The second foot segments 160 are telescoping segments that are connected by a second foot spring 162. The second foot spring 162 is a compression spring engaged between the second foot segments 160. As such, the second foot segments 160 are tensioned apart so that they are interiorly secured between two beads 152 in order to make a male-to-female mating connection with the beads 152. The foot 144 may also include a second foot pin 164. The foot 144 may include a slot extending between the second foot segments 160 such that the second foot pin 164 is engaged inside the slot to set the width of the foot 144 at the desired width. The foot 144 may include one or more of the second foot segments 160, the second foot spring 162, the second foot pin 164, or other suitable adjustable mechanisms.

When the foot 144 makes a mating connection with one or more of the beads 152 or otherwise with the deck 106, the foot 144 secures the deck adaptor 130 to the deck 106 of the vehicle 100, thereby stabilizing the stake base 126 and stake assembly 122 from twisting about the rail 120 of the vehicle 100. As such, the deck adaptor 130 and the rail adaptor 128 work in combination to stabilize the stake assembly 122 against the moment-arm created by loading on the stake 124 when the stake assembly 122 supports the stake 124.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A stake assembly for a vehicle that includes a bed with a deck and a wall, and a rail secured to the wall, the stake assembly comprising:
   a stake axis, the stake axis configured for orientation normal to the deck;
   a stake pocket, the stake pocket extending along the stake axis, and configured to support a stake by its end for extension along the stake axis above the stake pocket;
   a rail adaptor supported from the stake pocket, the rail adaptor extending laterally to the stake axis beside the stake pocket, and configured to secure to the rail; and
   a deck adaptor supported from the stake pocket, the deck adaptor extending along the stake axis beneath the stake pocket, and configured to secure to the deck to stabilize the stake pocket against the deck from twisting about the rail.

2. The stake assembly of claim 1, wherein the stake pocket is configured to receive the stake by its end along the stake axis from above.

3. The stake assembly of claim 1, wherein the rail adaptor is a C-channel compatible.

4. The stake assembly of claim 1, wherein the rail adaptor includes wing plates supported from the stake pocket, channel nuts and fasteners, the wing plates extending laterally to the stake axis flanking the stake pocket, and configured to back against the rail from outside the rail, the channel nuts configured to back against the rail from inside the rail, and the fasteners configured to extend through the wing plates and thread with the channel nuts to tighten the wing plates and the channel nuts against the rail, and thereby secure the rail adaptor to the rail.

5. The stake assembly of claim 1, wherein the deck adaptor extends aligned with the stake axis underneath the stake pocket.

6. The stake assembly of claim 1, wherein the deck adaptor includes a leg and a foot, the leg having an adjustable length for reaching from the stake pocket to the deck, and the foot configured to secure to the deck, the leg biased for increased length for securing the foot to the deck, and thereby securing the deck adaptor to the deck.

7. The stake assembly of claim 1, wherein the deck adaptor includes a foot, the foot configured to make a mating connection with the deck, and thereby secure the deck adaptor to the deck.

8. The stake assembly of claim 7, wherein the foot is compliant for making the mating connection with the deck.

9. The stake assembly of claim 7, wherein the foot has an adjustable width for making the mating connection with the deck.

10. The stake assembly of claim 9, wherein the foot is biased for one of increased width and decreased width.

11. A stake assembly for a vehicle that includes a bed with a deck and a wall, and a rail secured to the wall, the stake assembly comprising:
- a stake axis, the stake axis configured for orientation normal to the deck;
- a stake base, the stake base extending along the stake axis;
- a rail adaptor supported from the stake base, the rail adaptor including wing plates supported from the stake base, channel nuts and fasteners, the wing plates extending laterally to the stake axis flanking the stake base, and configured to back against the rail from outside the rail, the channel nuts configured to back against the rail from inside the rail, and the fasteners configured to extend through the wing plates and thread with the channel nuts to tighten the wing plates and the channel nuts against the rail, and thereby secure the rail adaptor to the rail; and
- a deck adaptor supported from the stake base, the deck adaptor extending along the stake axis beneath the stake base, and configured to secure to the deck to stabilize the stake base against the deck from twisting about the rail.

12. The stake assembly of claim 11, wherein the stake base is a stake pocket, the stake pocket configured to support a stake by its end for extension along the stake axis above the stake base.

13. The stake assembly of claim 12, wherein the stake pocket is configured to receive the stake by its end along the stake axis from above.

14. The stake assembly of claim 11, wherein the stake base is the end of a stake, the stake extending from its end along the stake axis above the stake base.

15. The stake assembly of claim 11, wherein the deck adaptor extends aligned with the stake axis underneath the stake base.

16. The stake assembly of claim 11, wherein the deck adaptor includes a leg and a foot, the leg having an adjustable length for reaching from the stake base to the deck, and the foot configured to secure to the deck, the leg biased for increased length for securing the foot to the deck, and thereby securing the deck adaptor to the deck.

17. The stake assembly of claim 11, wherein the deck adaptor includes a foot, the foot configured to make a mating connection with the deck, and thereby secure the deck adaptor to the deck.

18. The stake assembly of claim 17, wherein the foot is compliant for making the mating connection with the deck.

19. The stake assembly of claim 17, wherein the foot has an adjustable width for making the mating connection with the deck.

20. The stake assembly of claim 19, wherein the foot is biased for one of increased width and decreased width.

* * * * *

UNITED STATES PATENT AND TRADEMARK OFFICE
CERTIFICATE OF CORRECTION

PATENT NO. : 11,319,000 B2  
APPLICATION NO. : 16/707469  
DATED : May 3, 2022  
INVENTOR(S) : Christopher M. Higgins Page 1 of 1

It is certified that error appears in the above-identified patent and that said Letters Patent is hereby corrected as shown below:

In the Claims

Column 6, Line 50: Claim 3 delete "is a C-channel compatible" and insert --is C-channel compatible--

Signed and Sealed this
Twenty-first Day of June, 2022

Katherine Kelly Vidal
*Director of the United States Patent and Trademark Office*